United States Patent
Zhao et al.

(10) Patent No.: US 11,283,342 B1
(45) Date of Patent: Mar. 22, 2022

(54) ANNULAR LINEAR INDUCTION ELECTROMAGNETIC PUMP HAVING AXIAL GUIDE VANES

(71) Applicant: JIANGSU UNIVERSITY, Zhenjiang (CN)

(72) Inventors: Ruijie Zhao, Zhenjiang (CN); Xiaohui Dou, Zhenjiang (CN); Qiang Pan, Zhenjiang (CN); Desheng Zhang, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 17/419,732

(22) PCT Filed: Jan. 7, 2021

(86) PCT No.: PCT/CN2021/070588
§ 371 (c)(1),
(2) Date: Jun. 30, 2021

(51) Int. Cl.
*H02K 44/06* (2006.01)
*F04D 3/00* (2006.01)
(Continued)

(52) U.S. Cl.
CPC .............. *H02K 44/06* (2013.01); *F04D 3/00* (2013.01); *F04D 13/06* (2013.01); *F04D 29/445* (2013.01);
(Continued)

(58) Field of Classification Search
CPC ......... F04F 99/00; H02K 44/06; H02K 44/02; H02K 44/12; H02K 44/14; H02K 11/01;
(Continued)

(56) References Cited

U.S. PATENT DOCUMENTS

| 4,828,459 A | * | 5/1989 | Behrens | ............... G21C 15/247 |
| | | | | 417/50 |
| 5,415,529 A | * | 5/1995 | Le Boucher | ......... H02K 41/025 |
| | | | | 417/50 |

(Continued)

FOREIGN PATENT DOCUMENTS

| CN | 101382153 A | 3/2009 |
| CN | 201550009 U | 8/2010 |

(Continued)

OTHER PUBLICATIONS

Cristian Roman, et al., Study of the Electromagnetic Phenomena in the Annular Linear Induction Pump based on 3D Finite Element Models, The 8th International Symposium on Advanced Topics in Electrical Engineering, 2013.

*Primary Examiner* — Nathan C Zollinger
*Assistant Examiner* — Timothy P Solak
(74) *Attorney, Agent, or Firm* — Bayramoglu Law Offices LLC

(57) ABSTRACT

An annular linear induction electromagnetic pump having axial guide vanes is provided. m axial guide vanes are uniformly arranged in a flow channel of the electromagnetic pump in a circumferential direction, and a magnitude of m is equal to a number of external stators. A length of each of the guide vanes is precisely determined by a parameter P, and the value of the parameter P is calculated together by the number of the external stators, a central radius of the flow channel, a magnetic Reynolds number, a wave number of a traveling magnetic field and the mean fluid velocity. The axial guide vanes can significantly mitigate the impact on the flow field stability caused by uneven circumferential disturbances of the magnetic field and flow field, thereby achieving a flow stabilization effect with less hydraulic (Continued)

losses and greatly improving the flow stability in operation under off-design conditions.

12 Claims, 2 Drawing Sheets

(51) Int. Cl.
    *F04D 13/06*     (2006.01)
    *F04D 29/44*     (2006.01)
    *H02K 1/20*     (2006.01)
    *F04D 29/52*     (2006.01)
    *F04D 7/06*     (2006.01)

(52) U.S. Cl.
    CPC ............ *F04D 7/065* (2013.01); *F04D 29/528* (2013.01); *H02K 1/20* (2013.01)

(58) Field of Classification Search
    CPC ..... H02K 11/022; H02K 11/014; F04D 11/00; F04D 29/687
    See application file for complete search history.

(56) References Cited

U.S. PATENT DOCUMENTS

| | | | |
|---|---|---|---|
| 9,948,171 B1 | | 4/2018 | Salamey |
| 2010/0263454 A1 | * | 10/2010 | Araseki ................... G01F 1/582 |
| | | | 73/861.11 |

FOREIGN PATENT DOCUMENTS

| | | | | |
|---|---|---|---|---|
| CN | 105591521 A | | 5/2016 | |
| CN | 106961206 | * | 7/2017 | ............. H02K 44/06 |
| CN | 106961206 A | | 7/2017 | |
| CN | 107231079 A | | 10/2017 | |
| CN | 110994939 A | | 4/2020 | |
| JP | 2015065778 A | | 4/2015 | |

* cited by examiner

ANNULAR LINEAR INDUCTION ELECTROMAGNETIC PUMP HAVING AXIAL GUIDE VANES

CROSS REFERENCE TO THE RELATED APPLICATIONS

This application is the national phase entry of International Application No, PCT/CN2021/070588, filed on Jan. 7, 2021, which is based upon and claims priority to Chinese Patent Application No. 202010993274.0, filed on Sep. 21, 2020, the entire contents of which are incorporated herein by reference.

TECHNICAL FIELD

The present invention relates to the technical field of electromagnetic pumps, and in particular, to an annular linear induction electromagnetic pump having axial guide vanes.

BACKGROUND

An annular linear induction electromagnetic pump (Annular Linear Induction Pump, ALIP) is an ideal type of the circulating pump of conducting fluids selected for the accelerator driven sub-critical system (ADS), and the fourth-generation liquid-metal-cooled fast reactor. A coil winding of the ALIP is externally connected to a three-phase alternating current, the alternating current excites a traveling magnetic field, the traveling magnetic field then induces a current in the circulating liquid metal, and the interaction between the induced current and the traveling magnetic field generates a Lorentz force in the axial direction of the pump to push the liquid metal. The ALIP electromagnetic pump realizes directional movement of the liquid metal in complete closure. Such a driving method has a simple structure, has no mechanical movement or leakage, enables long-term stable operation, and has advantages over conventional mechanical pumps. However, the experimental results show that the ALIP electromagnetic pump of high working flow rate experiences unstable flows during the operation under low flow rate conditions. In such condition, the internal flow field disturbance occurs and reverse flows and large eddies emerge in the pump channel, causing the pressure pulsation at the pump outlet, oscillation of the flow rate and vibration of the pump. The pump usually has a narrow high-efficiency area, and when the flow slightly deviates from the design point, the efficiency of the pump significantly decreases. Accordingly, designing a novel structure capable of improving flow stability is the key technology for upsizing of LIP electromagnetic pumps.

In the Chinese Utility Model Patent CN200920217356 "Alternating-current Induction Pump with Added Inner and Outer Cores for Liquid Metal Transfer," a core is added both inside and outside a flow channel to reduce magnetic flux leakage, so that uneven distribution of a Lorentz force in a radial direction of the flow channel is mitigated, and the probability that a reverse flow occurs in a meridian plane of the flow channel is reduced, thereby improving efficiency; in the Invention Patent CN201911262539.3 "Self-flow-stabilizing Annular Linear Induction Electromagnetic Pump," a plurality of sections of external stators distributed in a staggered manner is designed, so that the degree of uneven distribution of an induced magnetic field in a circumferential direction is greatly reduced, thereby mitigating the impact of a non-axial Lorentz force on flow stability. In the Invention Patent CN201710167971 "Annular Linear Induction Electromagnetic Pump with Added Flow Stabilizing Guide Plate," a flow stabilizing guide plate is arranged in the axial direction of the flow channel to suppress unstable flow. The flow stabilizing guide plate can effectively hinder and destruct the formation and development of a fluid eddy in the flow channel, thereby greatly improving the flow stability of the molten metal in the pump. In the Invention Patent CN201710371575 "Multi-stage ALIT Electromagnetic Pump Having Flow Stabilizing Sections," the entire pump is divided into a plurality of pump sections, each pump section consists of a stage of electromagnetic section and a stage of flow stabilizing section, the electromagnetic section is responsible for inputting work to pressurize the molten metal, the flow stabilizing section is responsible for re-stabilizing the flow of molten metal, and two wiring modes for winding coils including single-sided wiring and double-sided wiring are provided, thereby improving the uniformity of a Lorentz force in the radial direction of the flow channel. The aforementioned patents all put forward some measures for making improvements and innovations to the ALIP electromagnetic pump, but the electromagnetic pump in the utility model patent is mainly applied under low flow rate conditions, and suppression methods for unstable flow in high flow rate pumps are not mentioned; the design scheme of the section-based external stators causes a complex structure of the pump and creates difficulties in processing and manufacturing. Moreover, the existing design of flow stabilizing guide plate is based on empirical design and it requires a precise design method for determining the size and arrangement area thereof.

In the present invention patent, for the design of a large ALIP, axial guide vanes are arranged to redesign a flow channel structure to improve the flow stability in the pump and enlarge a high-efficiency area of the pump, and a precise scheme of deciding the size and position of the axial guide vanes is provided so as to make it possible to design and manufacture an ALIP electromagnetic pump of high flow rate.

SUMMARY

In order to solve the technical problem of unstable flow and a narrow high-efficiency area in a large ALIP electromagnetic pump, the present invention discloses an annular linear induction electromagnetic pump having axial guide vanes, including the axial guide vanes, an outer flow channel tube, an inner flow channel tube, an internal stator, external stators, a coil winding, and a positioning chuck.

The inner flow channel tube and the outer flow channel tube are coaxially arranged, a flow channel for accommodating a liquid metal is formed between the inner flow channel tube and the outer flow channel tube, the internal stator is located inside the inner flow channel tube, the external stators are located outside the outer flow channel tube, the external stators are fixed by the positioning chuck, the positioning chuck is fixedly connected to the outer flow channel tube, the coil winding is filled in slots of the external stators, and the axial guide vanes are uniformly arranged in the flow channel in a circumferential direction.

Preferably, the axial guide vanes are arranged in areas where P<0, and P is determined by a magnetic Reynolds number $R_m$, a wave number k of a traveling magnetic field, an import wave number $K=K_1+iK_2$, a central radius R of the flow channel, a number m of the external stators, an input current frequency f and an average fluid velocity U. P is a rate of change of flow field disturbance over time, and $K_1$ and $K_2$ are respectively an imaginary part and a real part of the import wave number.

Preferably, a value of the P determining a position and an axial dimension of the axial guide vane is:

$$P = 0.5 - \frac{R_m^2 k^4}{R_m^2 k^4 + (m^2/R^2 + k^2)^2} + e^{-2K_2 z}\left[0.5 - \frac{\mu\sigma R^2}{m^2}\left(\frac{-2\pi f K_1}{K_1^2 + K_2^2} - U\right)K_2\right],$$

wherein μ and σ are respectively a magnetic conductivity and an electrical conductivity of the liquid metal, and z is axial coordinates.

Optionally, a number m of the axial guide vanes is equal to the number of the external stators, and in is greater than or equal to 6 and less than or equal to 10.

Preferably, a circumferential position of the axial guide vane in the flow channel is between two external stators.

Optionally, a thickness of the axial guide vane is ⅙ to ⅕ of a width of the flow channel, and an axial length is determined by the value of P.

Optionally, a winding of the coil winding is circumferentially wound in the slots of the external stators via a Y-type winding mode, and a number of pole-pairs is greater than or equal to 3 and less than or equal to 5.

Optionally, the axial guide vanes, the outer flow channel tube, the inner flow channel tube, and the positioning chuck are all made of a demagnetized stainless steel material.

Optionally, a layer of heat insulating material is laid ween the outer flow channel tube and the external stators.

Optionally, the internal stator and the external stators are all formed by laminating a plurality of silicon steel sheets.

By means of the aforementioned technical solution, the annular linear induction electromagnetic pump having axial guide vanes in the present invention has the following beneficial effects:

The same number of axial guide vanes as external stators are uniformly arranged in a flow channel of an electromagnetic pump in the present invention. The size and position of each vane are precisely determined by the value of P, which is positive or negative. The hydraulic loss and the resulting efficiency loss due to installation of the axial guide vanes are well controlled in this design method. The arranged axial guide vanes can significantly reduce the impact on the flow stability caused by uneven circumferential disturbances of a magnetic field and an axial velocity, so as to reduce the disturbances to a fluid from factors such as a non-axial Lorentz force, thereby suppressing unstable flow of a liquid metal in the flow channel. The present invention can effectively solve the problem of unstable flow in the annular linear induction electromagnetic pump while meeting service life and reliability requirements, and has characteristics such as simple structure and stable operation.

BRIEF DESCRIPTION OF THE DRAWINGS

To illustrate the technical solutions in the embodiments of the present invention more clearly, the accompanying drawings to be used in the description of the embodiments will be introduced briefly in the following. Apparently, the accompanying drawings in the following description are only some embodiments of the present invention, and those of ordinary skill in the art can obtain other drawings according to the accompanying drawings without creative efforts.

Additional remarks are provided below for the accompanying drawing:

1—axial guide vane, 2—outer flow channel tube, 3 inner flow channel tube, 4—internal stator, 5—external stator, 6—coil winding, 7—positioning chuck.

DETAILED DESCRIPTION OF THE EMBODIMENTS

The technical solutions in the embodiments of the present invention will be clearly and fully described below with reference to the accompanying drawings in the embodiments of the present invention. It is obvious that the embodiments to be described are only a part rather than all of the embodiments of the present invention. All other embodiments derived by those of ordinary skill in the art based on the embodiments of the present invention without carrying out creative efforts should fall within the protection scope of the present invention.

Embodiment

Figure 1A:
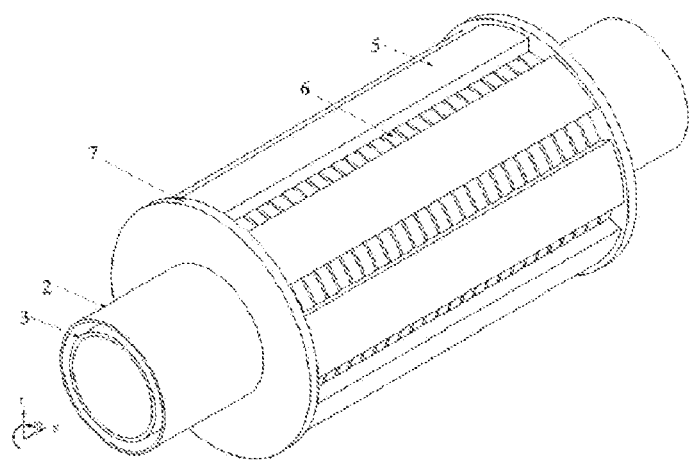
FIG. 1A is an isometric view of an annular linear induction electromagnetic pump having axial guide vanes.
Figure 1B:
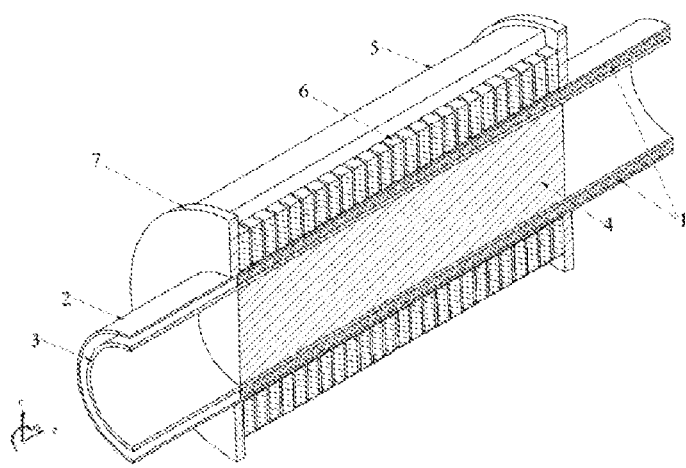
FIG. 1B is a sectional view of FIG. 1A.
Figure 1C:
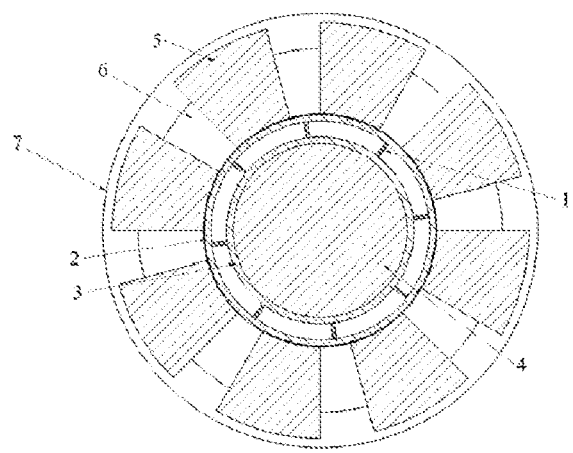
FIG. 1C is a cross-sectional view of FIG. 1A.

In order to solve the technical problems of unstable flow and a narrow high-efficiency area in a large ALIP electromagnetic pump, an embodiment provides an annular linear induction electromagnetic pump having axial guide vanes, which will be elaborated with reference to FIGS. 1 to 2.

An annular linear induction electromagnetic pump having axial guide vanes includes axial guide vanes (1), an outer flow channel tube (2), an inner flow channel tube (3), an internal stator (4), external stators (5), a coil winding (6), and a positioning chuck (7).

The inner flow channel tube (3) and the outer flow channel tube (2) are coaxially arranged. A flow channel for accommodating a liquid metal is formed between the inner flow channel tube (3) and the outer flow channel tube (2). The internal stator (4) is located inside the inner flow channel tube (3), and the external stators (5) are located outside the outer flow channel tube (2). The external stators (5) are fixed by the positioning chuck (7), and the positioning chuck (7) is fixedly connected to the outer flow channel tube (2). The coil winding (6) is filled in slots of the external stators (5). The axial guide vanes (1) are uniformly arranged in the flow channel in a circumferential direction.

In the embodiment, the axial guide vanes (I) are uniformly arranged in the circumferential direction of the flow channel depending on the value of P, which is positive or negative. The arranged axial guide vanes can significantly reduce the impact on the flow stability caused by uneven circumferential disturbances of a magnetic field and an axial velocity, so as to reduce disturbance to a fluid from factors such as a non-axial Lorentz force, thereby suppressing unstable flow of the liquid metal in the flow channel. The value of P is:

$$P = 0.5 - \frac{R_m^2 k^4}{R_m^2 k^4 + (m^2/R^2 + k^2)^2} + e^{-2K_2 z}\left[0.5 - \frac{\mu\sigma R^2}{m^2}\left(\frac{-2\pi f K_1}{K_1^2 + K_2^2} - U\right)K_2\right],$$

where μ and σ are respectively a magnetic conductivity and an electrical conductivity of the liquid metal, and z is axial coordinates. P is determined by a magnetic Reynolds number $R_m$, a wave number k of a traveling magnetic field, an import wave number $K=K_1-F_2$, a central radius R of the flow channel, a number m of the external stators, an input current frequency f, and an average fluid velocity U.

Figure 2A:
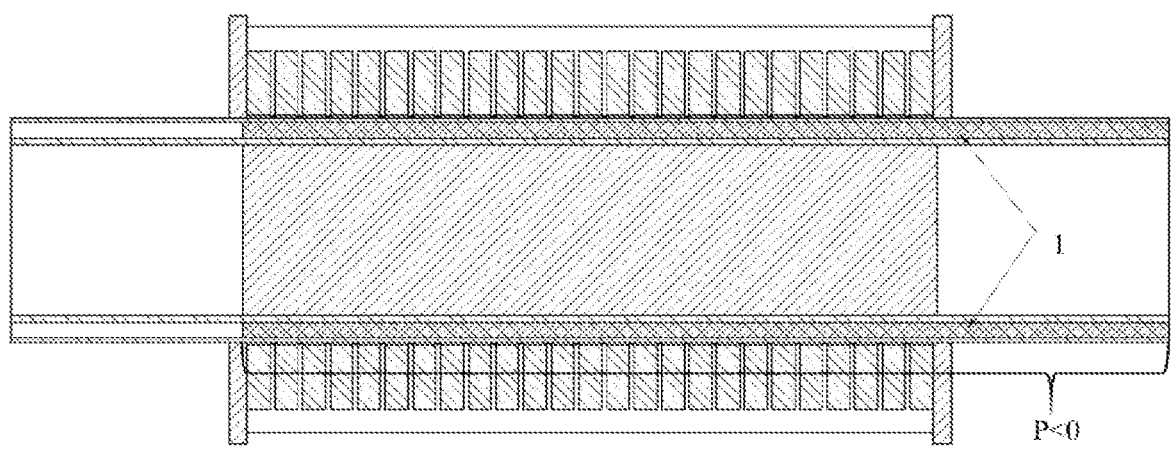
FIGS. 2A, 2B, and 2C illustrate three arrangement modes of the axial guide vanes.
Figure 2B:
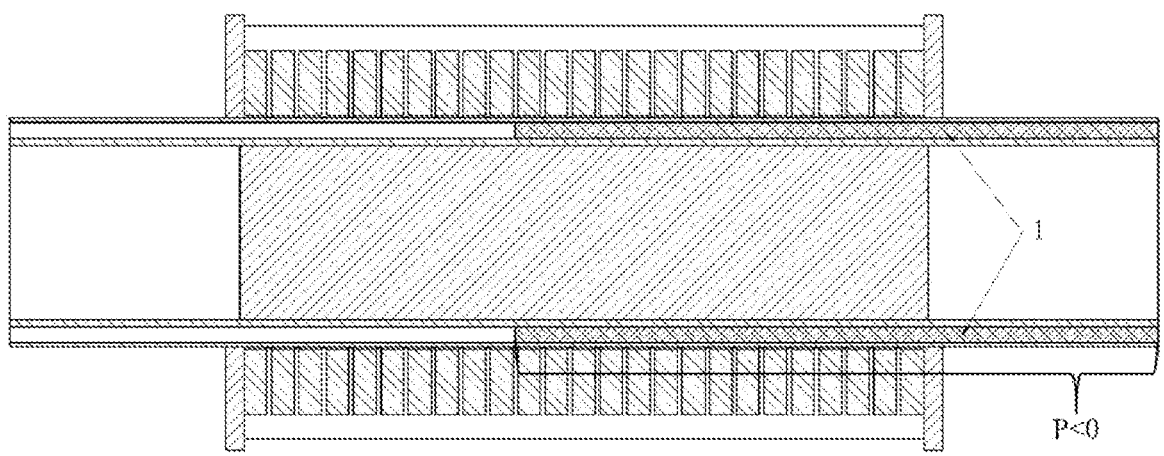
Figure 2C:
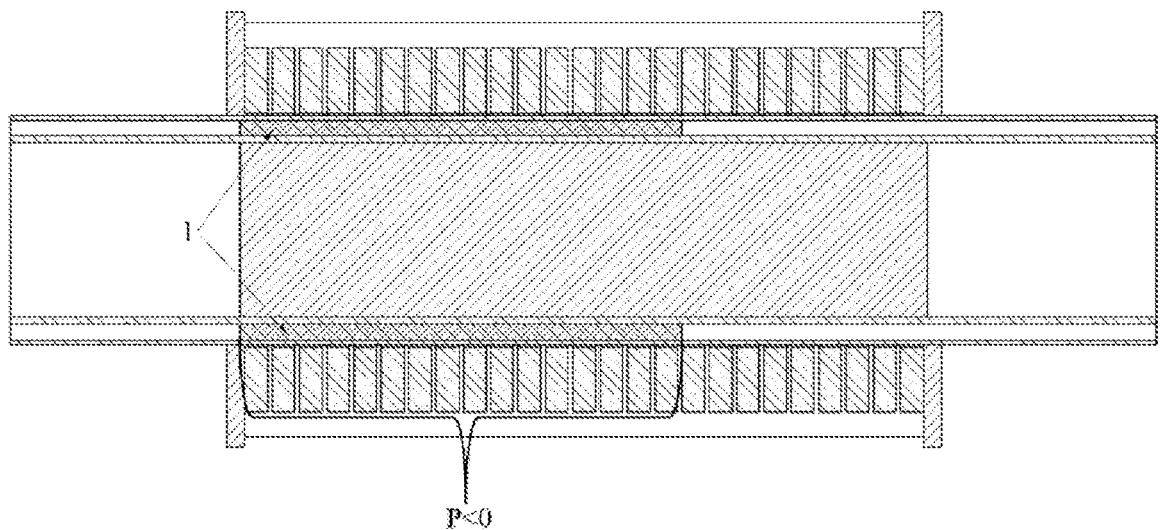

With reference to FIGS. 2A, 2B, and 2C, according to positive and negative values of P, the axial guide vanes (1) have a total of three arrangement modes in the flow channel, which are respectively an arrangement on the entire electromagnetic section and the exit section, an arrangement on a rear part of the electromagnetic section and the exit section, and an arrangement on a front part of the electromagnetic section.

In some examples, a number in of the axial guide vanes (1) is equal to the number of the external stators (5), and in is greater than or equal to 6 and less than or equal to 10.

In some examples, a circumferential position of the axial guide vane (I) in the flow channel is between two external stators (5).

In some examples, a thickness of the axial guide vane (1) is ⅙ to ⅕ of a width of the flow channel, and an axial length is determined by the value of P.

In some examples, a winding of the coil winding (6) is circumferentially wound in the slots of the external stators (5) via a Y-type winding mode, and a number of pole-pairs is greater than or equal to 3 and less than or equal to 5.

In some examples, the axial guide vanes (I), the outer flow channel tube (2), the inner flow channel tube (3), and the positioning chuck (7) are all made of a demagnetized stainless steel material.

In some examples, a layer of heat insulating material is laid between the outer flow channel tube (2) and the external stators (5).

In some examples, the internal stator (4) and the external stators (5) are all formed by laminating a plurality of silicon steel sheets.

The external stators (5) are each formed by laminating a plurality of silicon steel sheets, and in order to balance the uniformity of magnetic field distribution and the heat dissipation performance of the pump, the external stators are each provided with a fan-shaped section.

The applicant found through extensive research that an ALIP electromagnetic pump of high flow rate can easily generate unstable flow under low flow rate conditions, and the main cause of unstable flow is the disturbances of a magnetic field and a flow field due to the structures of external stators and flow channel. In a conventional ALIP electromagnetic pump, considering the problem of heat dissipation of the pump, external stators are designed as split stators uniformly distributed in a circumferential direction. Such split external stators cause uneven distribution of an electromagnetic field generated by a three-phase alternating current in the circumferential direction, then cause uneven distribution of a Lorentz force on a liquid metal in the circumferential direction, and finally cause strong distorted flow field in the channel. The fluid velocity in the sector of the flow channel next to the external stator core is greater than the fluid velocity in the sector of the flow channel corresponding to the air gap between two stators. Such non-uniformity of the Lorentz force and velocity accumulates over time, which causes unstable flow, such as reverse flow and vortices. In the present invention, axial guide vanes are arranged in a flow channel without changing the structure of external stators. The arrangement areas of the axial guide vanes are determined by a positive or negative value of P. The value of P is a rate of change of the flow field disturbance in the flow channel over time. If P has a negative value, the disturbance increases over time. If P has a positive value, the disturbance decreases over time until it disappears. Therefore, the axial guide vanes are arranged in areas where the value of P is negative. The value of P is:

$$P = 0.5 - \frac{R_m^2 k^4}{R_m^2 k^4 + (m^2/R^2 + k^2)^2} + e^{-2K_2 z}\left[0.5 - \frac{\mu\sigma R^2}{m^2}\left(\frac{-2\pi f K_1}{K_1^2 + K_2^2} - U\right)K_2\right].$$

The number of the axial guide vanes is m. The larger the number of the axial guide vanes, the more likely the value of P is positive. Therefore, the arranging of the axial guide vanes in the flow channel can suppress flow field and magnetic field disturbance in the flow channel as much as possible, can significantly reduce the impact on the flow stability caused by uneven circumferential disturbance of a magnetic field and an axial velocity, so as to reduce disturbance to a fluid from factors such as a non-axial Lorentz force, thereby suppressing unstable flow of the liquid metal in the flow channel.

To sum up, the present invention discloses an annular linear induction electromagnetic pump having axial guide vanes, where in axial guide vanes are uniformly arranged in a flow channel of the electromagnetic pump in a circumferential direction, a magnitude of in is the same as a number of external stators, and a length of the guide vane is precisely determined together by the number of the external stators, a central radius of the flow channel, a magnetic Reynolds number, a wave number of a traveling magnetic field and the mean fluid velocity. The axial guide vanes can significantly mitigate the impact on the flow field stability caused by uneven circumferential disturbances of the magnetic field and the flow field, thereby achieving a flow stabilization effect with less hydraulic losses and greatly improving the flow stability in operation under off-design conditions.

In the description of this specification, the description with reference to the term "an embodiment," "some embodiments," "exemplary embodiments," "examples," "specific examples," "some examples" or the like means that specific features, structures, materials, or characteristics described in conjunction with the embodiment or example are included in at least one embodiment or example of the present invention. In this specification, the schematic expressions of the aforementioned terms do not necessarily refer to the same embodiment or example. Furthermore, the specific features, structures, materials, or characteristics described may be combined in a suitable manner in any one or more embodiments or examples.

The above descriptions are merely preferred embodiments of the present invention and are not intended to limit the present invention. Any modifications, equivalent replacements, improvements and the like lade within the spirit and principle of the present invention should be included in the protection scope of the present invention.

What is claimed is:

1. An annular linear induction electromagnetic pump having axial guide vanes, comprising the axial guide vanes, an outer flow channel tube, an inner flow channel tube, an internal stator, external stators, a coil winding, and a positioning chuck; wherein
  the axial guide vanes are connected between the outer flow channel tube and the inner flow channel tube,
  the outer flow channel tube and the inner flow channel tube are coaxially arranged,
  the internal stator is filled in the inner flow channel tube,
  the external stators are arranged outside the outer flow channel tube through the positioning chuck, the positioning chuck is fixedly connected to the outer flow channel tube, and the coil winding is filled in slots of the external stators;

wherein the axial guide vanes are arranged in areas where P<0, wherein

P is a rate of change of flow field disturbance over time, and P is determined by a magnetic Reynolds number $R_m$, a wave number k of a traveling magnetic field, an import wave number $K=K_1+iK_2$, a central radius R of a flow channel, a number in of the external stators, an input current frequency f, and an average fluid velocity U, $K_1$ and $K_2$ are respectively an imaginary part and a real part of the import wave number, and a value of P determining a position and an axial dimension of the axial guide vane is:

$$P = 0.5 - \frac{R_m^2 k^4}{R_m^2 k^4 + (m^2/R^2 + k^2)^2} + e^{-2K_2 z}\left[0.5 - \frac{\mu\sigma R^2}{m^2}\left(\frac{-2\pi f K_1}{K_1^2 + K_2^2} - U\right)K_2\right].$$

wherein μ and σ are respectively a magnetic conductivity and an electrical conductivity of a liquid metal, and z is axial coordinates.

2. The annular linear induction electromagnetic pump having the axial guide vanes according to claim 1, wherein the number m of the external stators is equal to a number of the axial guide vanes, m is greater than or equal to 6 and less than or equal to 10, a circumferential position of the axial guide vane in the flow channel is between two external stators, a thickness of the axial guide vane is ⅙ to ⅕ of a width of the flow channel, and an axial length is determined by the value of P.

3. The annular linear induction electromagnetic pump having the axial guide vanes according to claim 2, wherein the axial guide vanes, the outer flow channel tube, the inner flow channel tube, and the positioning chuck are made of a demagnetized stainless steel material.

4. The annular linear induction electromagnetic pump having the axial guide vanes according to claim 2, wherein a layer of a heat insulating material is laid between the outer flow channel tube and the external stators.

5. The annular linear induction electromagnetic pump having the axial guide vanes according to claim 2, wherein the internal stator and the external stators are formed by laminating a plurality of silicon steel sheets.

6. The annular linear induction electromagnetic pump having the axial guide vanes according to claim 1, wherein a winding of the coil winding is circumferentially wound in the slots of the external stators via a Y-type winding mode, and a number of pole-pairs is greater than or equal to 3 and less than or equal to 5.

7. The annular linear induction electromagnetic pump having the axial guide vanes according to claim 6, wherein the axial guide vanes, the outer flow channel tube, the inner flow channel tube, and the positioning chuck are made of a demagnetized stainless steel material.

8. The annular linear induction electromagnetic pump having the axial guide vanes according to claim 6, wherein a layer of a heat insulating material is laid between the outer flow channel tube and the external stators.

9. The annular linear induction electromagnetic pump having the axial guide vanes according to claim 6, wherein the internal stator and the external stators are formed by laminating a plurality of silicon steel sheets.

10. The annular linear induction electromagnetic pump having the axial guide vanes according to claim 1, wherein the axial guide vanes, the outer flow channel tube, the inner flow channel tube, and the positioning chuck are made of a demagnetized stainless steel material.

11. The annular linear induction electromagnetic pump having the axial guide vanes according to claim 1, wherein a layer of a heat insulating material is laid between the outer flow channel tube and the external stators.

12. The annular linear induction electromagnetic pump having the axial guide vanes according to claim 1, wherein the internal stator and the external stators are formed by laminating a plurality of silicon steel sheets.

* * * * *